(12) United States Patent
Yang

(10) Patent No.: US 8,643,325 B2
(45) Date of Patent: Feb. 4, 2014

(54) INTEGRATED BATTERY CHARGER

(75) Inventor: Fu-I Yang, Taoyuan County (TW)

(73) Assignee: Samya Technology Co., Ltd., Taoyuan County (TW)

(*) Notice: Subject to any disclaimer, the term of this patent is extended or adjusted under 35 U.S.C. 154(b) by 468 days.

(21) Appl. No.: 13/094,161

(22) Filed: Apr. 26, 2011

(65) Prior Publication Data

US 2012/0235641 A1  Sep. 20, 2012

(30) Foreign Application Priority Data

Mar. 18, 2011 (TW) .............................. 100109262 A

(51) Int. Cl.
    *H02J 7/00* (2006.01)
(52) U.S. Cl.
    USPC .......................................... 320/107; 320/111
(58) Field of Classification Search
    USPC .................. 320/107, 110, 111, 113
    See application file for complete search history.

(56) References Cited

U.S. PATENT DOCUMENTS

| 8,043,100 | B2* | 10/2011 | Liao | ............................... 439/131 |
| 2012/0249071 | A1* | 10/2012 | Yang | .............................. 320/110 |
| 2013/0150134 | A1* | 6/2013 | Pliner et al. | ................... 455/573 |

* cited by examiner

*Primary Examiner* — Richard V Muralidar
(74) *Attorney, Agent, or Firm* — Rosenberg, Klein & Lee

(57) ABSTRACT

An integrated battery charger can be used as a charger for a plurality of AA or AAA batteries that can be charged independently and separately in a charging mode and taken out for use by electronic products or it can be used as a discharger switched into a combined serial connection discharging mode by a manual switch for outputting a stabilized DC power for charging a portable electronic product. The present invention is designed and integrated with the switching modes of the manual switch for constituting a circuit structure featuring an "independent separate charging and serially combined discharging mode" and a "synchronous switch control charging and discharging mode" so as to overcome the problems of conventional AA or AAA battery chargers and lithium batteries designed as a portable power and to enhance the effect and safety of the charger.

10 Claims, 16 Drawing Sheets

INTEGRATED BATTERY CHARGER

BACKGROUND OF THE INVENTION (a) Field of the Invention

The present invention relates to a battery charger, and more particularly to a charger designed for charging, discharging and supplying electric power to an AA or AAA rechargeable battery, and a manual switch synchronous control is provided to integrate a circuit structure with "an independent separate charging circuit and a combined serial discharging circuit."

(b) Description of the Related Art

As portable 3C electronic products become more popular, the demand for batteries becomes higher as well. That a disposable battery (namely a primary battery) is discarded after use not only increases the cost, but also causes environmental pollutions. Therefore, a rechargeable battery (namely a secondary battery) has a higher demands than that of a primary battery since a rechargeable battery can save costs and reduce contaminations of waste batteries.

At present, rechargeable batteries include lithium-ion (Li-ion) batteries, nickel metal hydride (Ni-MH) batteries, nickel cadmium (Ni—Cd) batteries and the rechargeable alkaline batteries, and these batteries are also known as secondary batteries. Recently, a lithium battery with an organic electrolytic unit is used extensively in portable electronic devices due to its features of high-energy density, low temperature, and stable storage.

However, a lithium battery still has the following drawbacks in its use:

1. A lithium battery usually comes with different specifications for the electronic products from different brands. Even for the electronic products of the same brand, such as the Nokia mobile phones, there may be tens of models of the lithium batteries, and thus causing tremendous inconveniences and trouble to users.

2. A lithium battery contains an electrolytic unit, and there is a safety concern such as possible explosion when a over-current occurs.

3. Most of the present portable powers use a built-in lithium battery as an energy storage unit, but it generally does not come with a standard size for general electronic consumer products. As a result, the fully charged battery cannot be used alone when it is taken out. Even though it can be taken out, there are so many specifications of the lithium batteries, and such application is impractical.

Compared with the lithium battery, although the secondary battery, such as the nickel metal hydride (Ni-MH), nickel cadmium (Ni—Cd) or alkaline rechargeable secondary battery has an energy storage density less than that of the lithium battery, yet its widely used AA or AAA battery sets an industrial specification, which is the main reason of its popularity up to now. However, its use still has the following insufficiencies:

1. Although the AA or AAA battery charger has the charging and discharging functions, several pieces of batteries are usually connected in series and put into the charging compartment, and the same charging circuit is used for charging each battery. This application may have drawbacks such as overheating, leak and undercharge.

2. After the batteries (generally four pieces of batteries) in the charging compartment are fully charged by a conventional AA or AAA battery charger, it is necessary to connect the batteries in series in order to discharge a DC voltage equal to $(1.2V\sim1.5V)\times4=4.8V\sim6V$ for the use by portable electronic products, since each battery has a voltage approximately equal to 1.2V~1.5V only. The conventional serially-connected batteries discharge electric power by turning ON/OFF an electronic switch or a relay composed of a semi-conducting unit, and positive and negative terminals of the batteries are serially connected to jointly discharge and supply electric power for the use as a charging power. However, the electronic switch has internal impedance when discharging a large current, and consumes energy during its ON/OFF operations. Furthermore, the voltage and current usually come with a phase difference, and thus there is a switching loss or a surge produced, and these factors affect the discharging performance and the energy storage of the charger when it is used as a discharger. Therefore, the electronic switch used as a switch component for the serially connected batteries is not a good option, and definitely requires further improvements. Thus, the inventor of the present invention has been devoted to the research and development of improving battery chargers/dischargers to overcome the above-mentioned drawbacks.

SUMMARY OF THE INVENTION

Therefore, it is a primary object of the present invention to overcome the shortcomings of the present lithium battery and nickel metal hydride/cadmium battery chargers by providing an integrated battery charger, wherein the charging or discharging mode of each battery in the charging compartment of the charger is switched and controlled by a manual switch synchronously in a single operation, and thus the invention provides a convenient operation without causing problems of internal impedance and switching loss existed in the electronic switch, and achieves the effect of enhancing the charging and discharging performance.

Another object of the present invention is to provide an integrated battery charger capable of charging one or more batteries separately to avoid the overheating, leak and undercharge that may occur when charging a plurality of serially-connected batteries. In addition, the batteries can be serially connected and directly combined in the same charger for outputting and discharging power. A stable standard USB power output of DC 5.0V can be supplied after the voltage is processed by a voltage regulator circuit.

A further object of the present invention is to provide an integrated battery charger, serving as a charger when a battery is charged in an independent separate charging mode and removed from the charger for the use by an electronic product, or serving as a discharger when a manual switch is switched to a serially connected and combined discharging mode, and a stabilized DC power is outputted for charging a portable electronic product, or serving as an adaptor by directly supplying a DC charging power when there is no battery placed in the charger or the power of an electronic device is low. In addition, the battery charger becomes a portable power when it is carried out, such that when the power of an electronic device is low, the charger can serve as a backup secondary battery. Even one alkaline primary battery can be placed in the battery charger for the discharging, and thus the battery charger also serves as an emergency power supply device.

In order to achieve the above-mentioned objects, the invention includes:

a casing, for containing charging components, and having a charging block disposed on a surface of the casing, a plurality of charging compartments formed in the charging block for placing a plurality of AA or AAA batteries respectively, and an end of the charging compartment being a positive terminal, and the other end of the charging compartment being a negative terminal, and the casing having a plug connectible to an external power source;

an input power source, for converting an external (AC or DC) power into an DC power to charge any one of the batteries in the charging block and supply a reference voltage source to a charging control unit;

a voltage control unit and a current control unit, coupled between an input terminal of the charging control unit and the input power source to form a charging circuit, and an output terminal of the charging control unit comprising a plurality of charging current control circuits, such that the charging block forms a plurality of independent separate charging circuits, and an output terminal of each charging circuit is coupled to a positive terminal of each of the charging compartments;

a manual switch, with a main body having a switchable insulated operating interface, and the insulated operating interface being exposed from a surface of the casing, and containing (n−1) sets of mechanical switching units (SW1~SWn−1) corresponding to a plurality of charging circuits (n) of the charging block, such that one set of mechanical switching unit is disposed between two adjacent charging circuits, and the last set of mechanical switching unit (SWn) of the manual switch is an independent charging/discharging control module, and each of the mechanical switching units (SW1~SWn) has three contact points a, b, c, wherein the contact point a of the first to $(n-1)^{th}$ sets of mechanical switching units (SW1~SWn−1) is grounded or grounded through a current detection resistor, and the contact point b is coupled to a positive terminal of a next charging circuit, and the contact point c is electrically coupled to a negative terminal of each corresponding charging compartment, and the contact point a of the nth set of the mechanical switching unit ($SW_n$) as the charging/discharging control module is a charging control terminal, the contact point b is a discharging control terminal, and the contact point c is a power control terminal (CONTROL H/L) coupled to the input power source or grounded, and when the insulated operating interface of the manual switch is switched, n pieces of independent conductive terminals disposed at the bottom of the manual switch are linked to shift synchronously, and when each of the conductive terminals is switched to any position, an end of the conductive terminal is always electrically coupled to the corresponding contact point c, and the other end of the conductive terminal is electrically coupled to the contact point a or the contact point b only;

a charging control circuit, composed of a contact point a and a contact point c of the charging/discharging control module, and electrically coupled to the input power source, for controlling the ON/OFF of outputting a charging power from the input power source to the charging block;

a discharging control switch, comprising an input terminal, an output terminal and a control terminal, and the input terminal being coupled to a positive terminal of the first charging compartment in the charging block, and the output terminal being coupled to a voltage regulator circuit, and the control terminal being electrically coupled to a contact point b of the charging/discharging control module, for controlling the ON/OFF of the input terminal with the output terminal, such that the serially connected and combined discharging current of each battery in the charging block is outputted to the voltage regulator circuit;

the voltage regulator circuit, for boosting or stepping down the input power to a predetermined DC voltage; and at least one USB output port, coupled to an output terminal of the voltage regulator circuit, and having a socket exposed from the casing;

whereby, when the manual switch switches to a charging mode, each contact point c and each contact point a of all n sets of mechanical switching units (SW1~SWn) are turned ON synchronously, such that each battery on the charging circuit is in an independent separate charging mode, and the discharging control switch E is turned OFF synchronously, and the charging control circuit (A) is controlled to turn ON to charge each battery by the charging current, and when the manual switch switches to a discharging mode, each contact point c and each contact point b of all n sets of mechanical switching units (SW1~SWn) are turned ON synchronously, such that each battery on the charging circuit is in a serial connected and combined discharging mode, and the charging control circuit (A) is turned OFF and the discharging control switch (E) is turned ON synchronously, such that each battery is serially connected to output the discharging current, so as to form a single manual switch capable of integrating the independent separate charging or the serially connected and combined discharging between the charging and discharging circuits, and synchronously controlling the ON/OFF of the charging current and discharging current.

According to the foregoing technique features, the operation modes of the charger of the present invention include:

a) under the condition of having an external power source:

i) when the manual switch switches to the charging mode, the plurality of rechargeable batteries in the charging block forms independent and separate charging circuits, and the charging/discharging control module synchronously controls the charging control circuit (A) to turn ON and the discharging control switch (E) to turn OFF, so as to constitute a battery charger;

ii) when the manual switch switches to the discharging mode, each battery of the charging block forms a serially connected and combined discharging circuit, and the charging/discharging control module synchronously controls the charging control circuit (A) to turn OFF and the discharging control switch (E) to turn ON, such that the serially connected discharging current is outputted through the voltage regulator circuit for stabilizing the voltage, and then the USB output port supplies an electric power, so as to form a discharger;

Moreover, the input power source is further externally coupled to an auxiliary power supply, and the auxiliary power supply is coupled to the voltage regulator circuit for stabilizing the input power source and then supplying the power to the USB output port, such that the charger can charge the batteries concurrently, independently and separately and can output a USB power at the same time, so as to form a dual function device with the functions of a charger and an adaptor, and capable of charging a battery and supplying an electric power to an electronic product concurrently.

Furthermore, the switching power supply is further externally coupled to an auxiliary power supply, and the auxiliary power supply is coupled to the voltage regulator circuit for stabilizing the switching power supply and then supplying the power to the USB output port such that the charger can become an adaptor for outputting power to the USB output port for directly supplying power to the electronic products.

b) under the condition of having no external power source:

i) when the manual switch switches to the charging mode, each charging circuit has no charging current, and the charger is in a non-using status; and ii) when the manual switch switches to the discharging mode, a charged backup secondary battery or a primary battery in the charging block forms a serially connected and combined discharging circuit, and the charging/discharging control module synchronously controls the discharging control switch (E) to turn ON, such that the serially connected and combined discharging current is stabilized by the voltage regulator circuit, and then the USB output port supplies an electric power to a portable electronic product, so as to form a portable power or an emergency power supply.

According to the forgoing techniques, the present invention is provided and integrated with the switching modes of the manual switch for constituting a circuit structure featuring an "independent separate charging and serially combined discharging mode" and a "synchronous switch control charging and discharging mode" without increasing the volume of the charger so as to overcome the problems of conventional chargers for nickel metal hydride batteries and nickel cadmium batteries and the problems of lithium batteries designed as a portable power, and to enhance the effect and safety of the charger.

DETAILED DESCRIPTION OF THE PREFERRED EMBODIMENT

Figure 1:
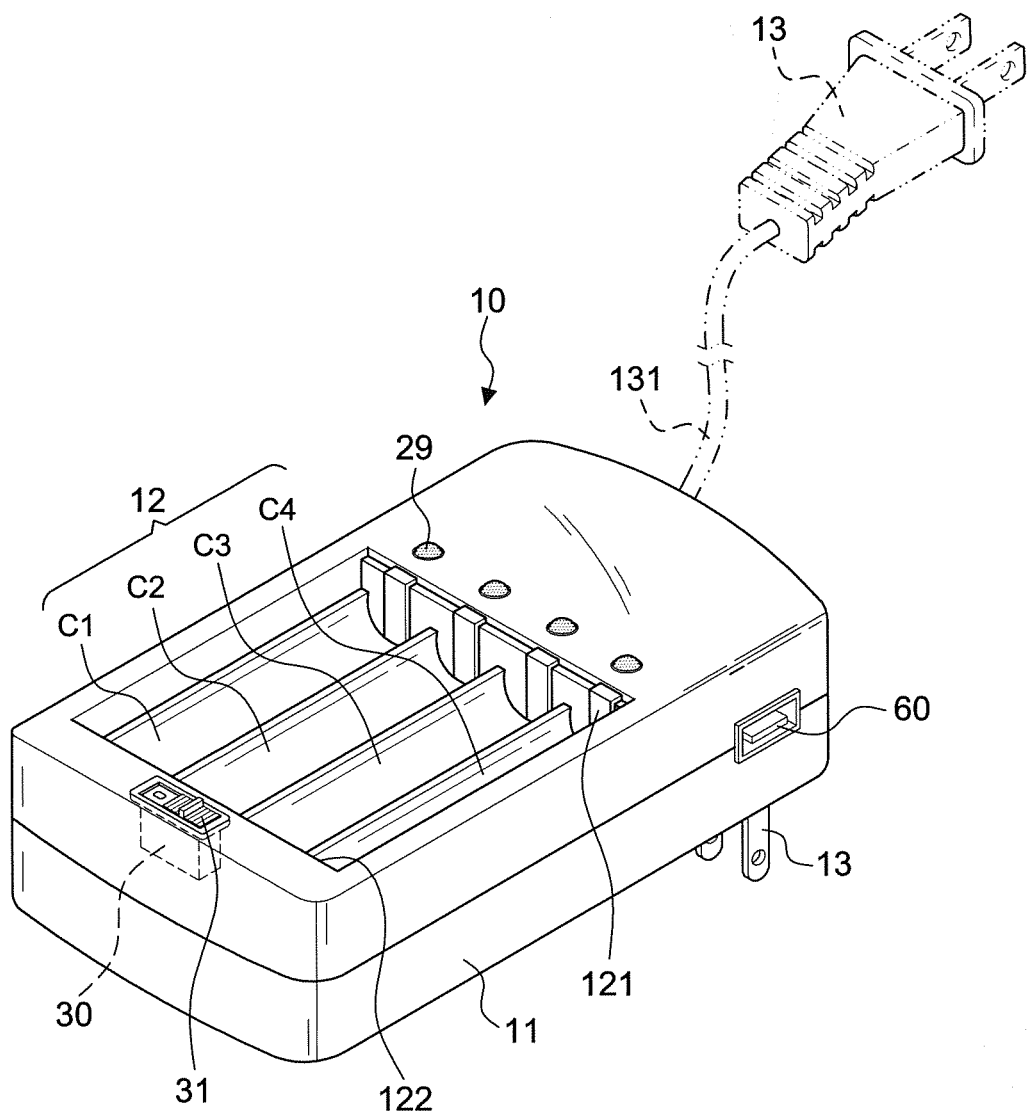
FIG. 1 is a perspective view of the present invention.

With reference to FIG. 1 for a perspective view of a battery charger 10 of the present invention, the charger 10 comprises: a casing 11, for containing and covering charging components (such as a switching power supply and a charging circuit), and a charging block 12 disposed on a surface of the casing 11 and having a plurality of charging compartments provided for placing a plurality of AA or AAA batteries B1~B4 therein. In this preferred embodiment, there are four charging compartments C1, C2, C3, C4, but the invention is not limited to such quantity only. In a small charger, there could be only two charging compartments. A charger with four charging compartments are used as an example for the description of a preferred embodiment and the illustration of its related drawings as follows. The casing 11 further comprises a plug 13 connectible to an external power source, wherein the plug 13 of this preferred embodiment is foldable and disposed at the bottom of the casing 11. Of course, an external power cable 131 or a replaceable plug 13 can be used instead for connecting with the external power source.

Figure 6A:
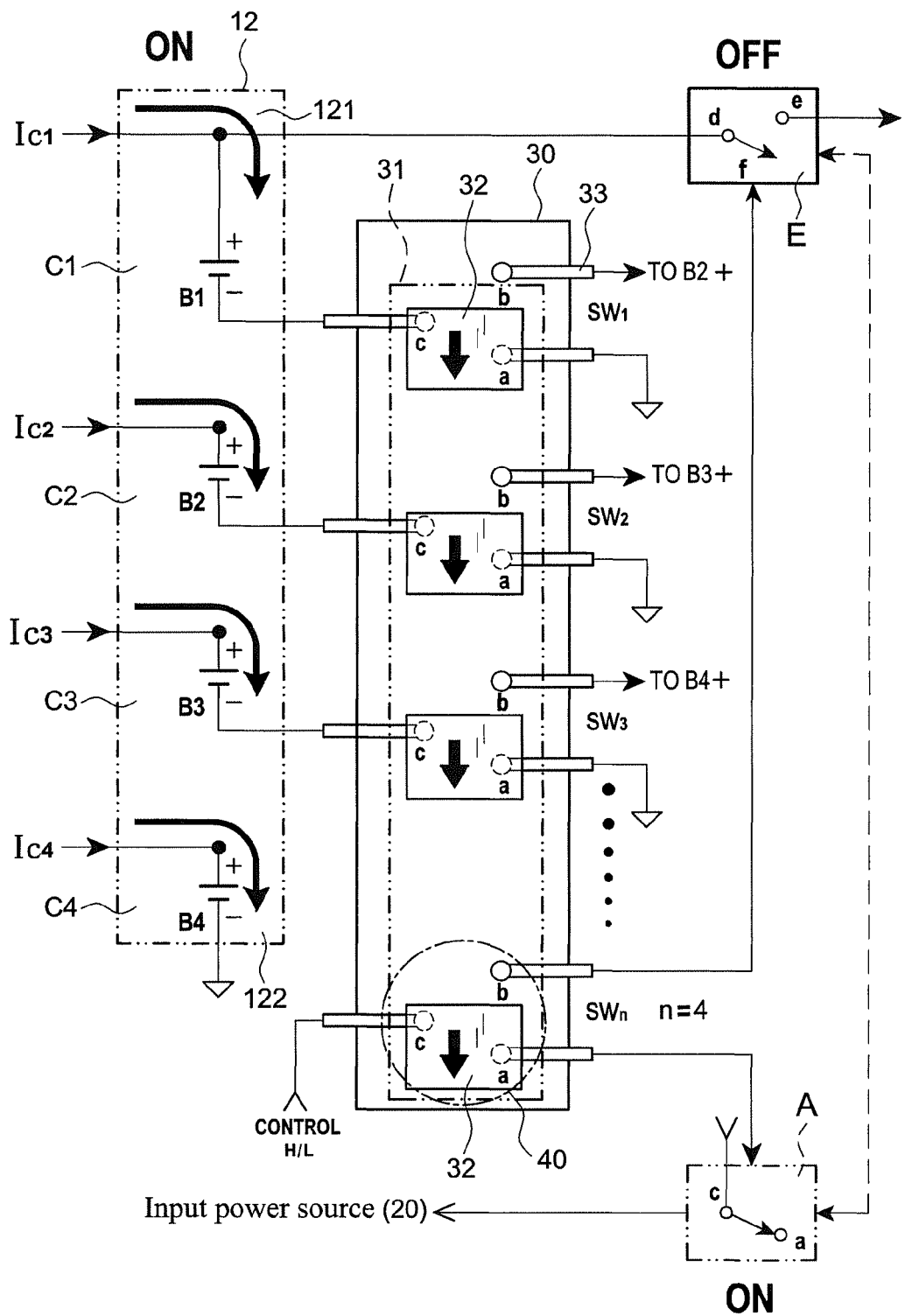
FIGS. 6A and 6B are schematic circuit diagrams showing a charging status and a discharging status of a manual switch in accordance with an embodiment of the present invention respectively.

The casing 11 includes at least one USB output port 60 formed on a side of the casing 11, and its connection socket is exposed from the casing 11 and used as an output terminal of an external DC power to be supplied. In addition, a manual switch 30 has an insulated operating interface 31 exposed from the casing 11, wherein the manual switch 30 of this preferred embodiment is, but not limited to, a two-stage slide switch. A press button or a differential switch is also applicable. To cope with the independent separate charging circuit in the charging block 12 of the present invention, it is necessary to install two or more sets of mechanical switching units $SW_1$~$SW_n$ in the manual switch 30 as shown in FIG. 6A. In other words, the manual switch 30 has a plurality of pins 33, and each set of the mechanical switching unit $SW_1$~$SW_1$ is formed by at least three contact points, and its structure will be described together with the charging circuit below.

Although the charging block 12 as shown in FIG. 1 does not have an external cover on the top, it is not limited to this arrangement. That is, it may further have an external cover. In addition, the casing 10 includes a plurality of display units 29 which may be LEDs for displaying a charging status of each charging compartment C1~C4. Each charging compartment has a positive terminal 121 and a corresponding negative terminal 122.

Figure 2:
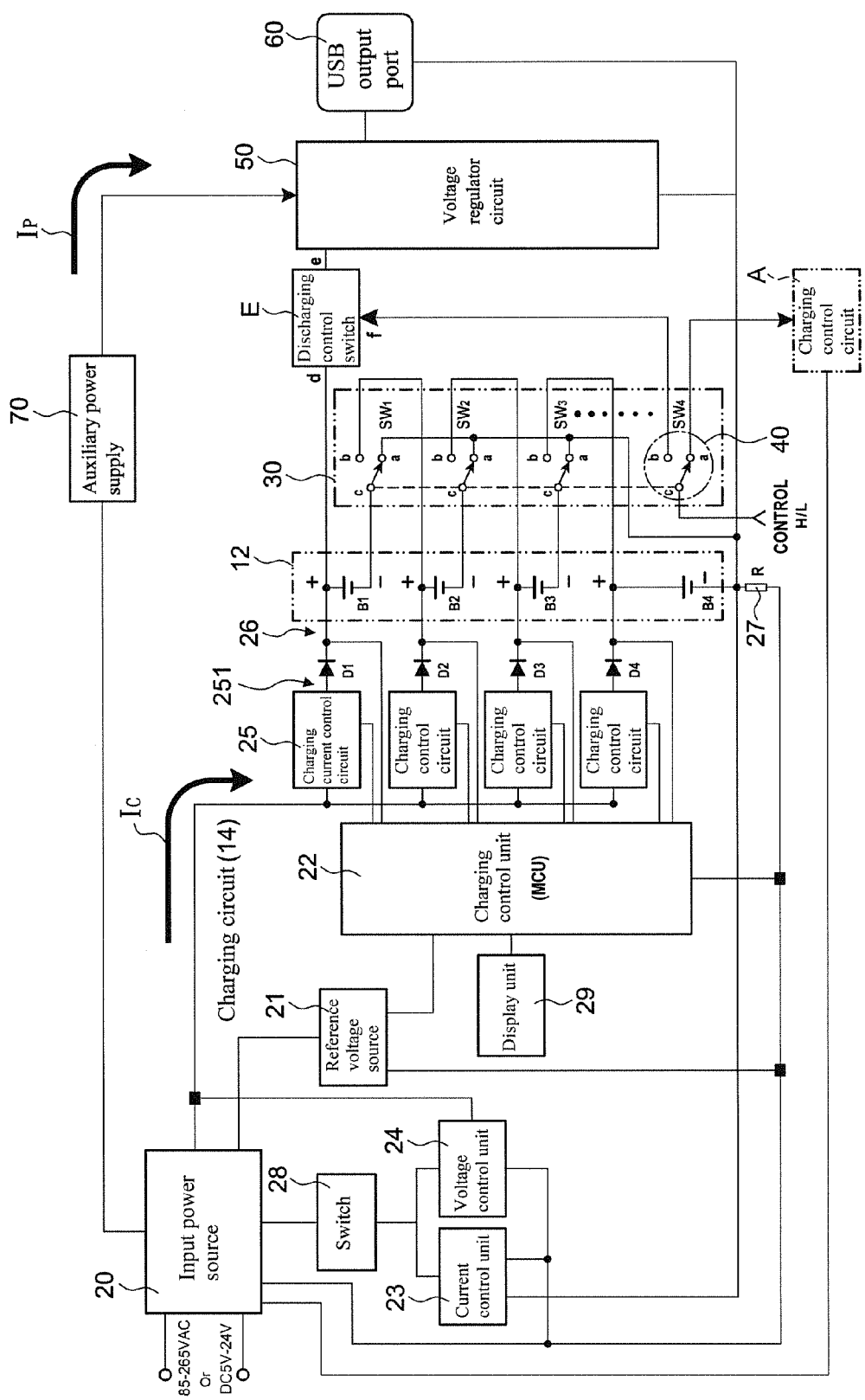
FIG. 2 is a schematic circuit diagram of a preferred embodiment of the present invention.

With reference to FIG. 2 for a schematic circuit diagram of a preferred embodiment of the present invention, most of the components in this circuit structure are contained in the casing 11, and only a small number of components is exposed from the surface of the casing 11, and the circuit structure primarily comprises the following elements:

An input power source 20 is provided for converting AC or DC power to DC power, charging the rechargeable batteries B1~B4 on the charging block 12, and supplying a reference voltage source 21 to a charging control unit 22, wherein the charging control unit 22 is a microprocessor control unit (MCU), and controls the operation of each component of the charging circuit by executing a predetermined sequence of procedures.

The input terminal of the charging control unit 22 and the input power source 20 are coupled to a current control unit 23 and a voltage control unit 24, and a switch 28 is installed between therein. The charging circuit 14 composed of the foregoing components is a prior art, and thus will not be described here.

Figure 3A:
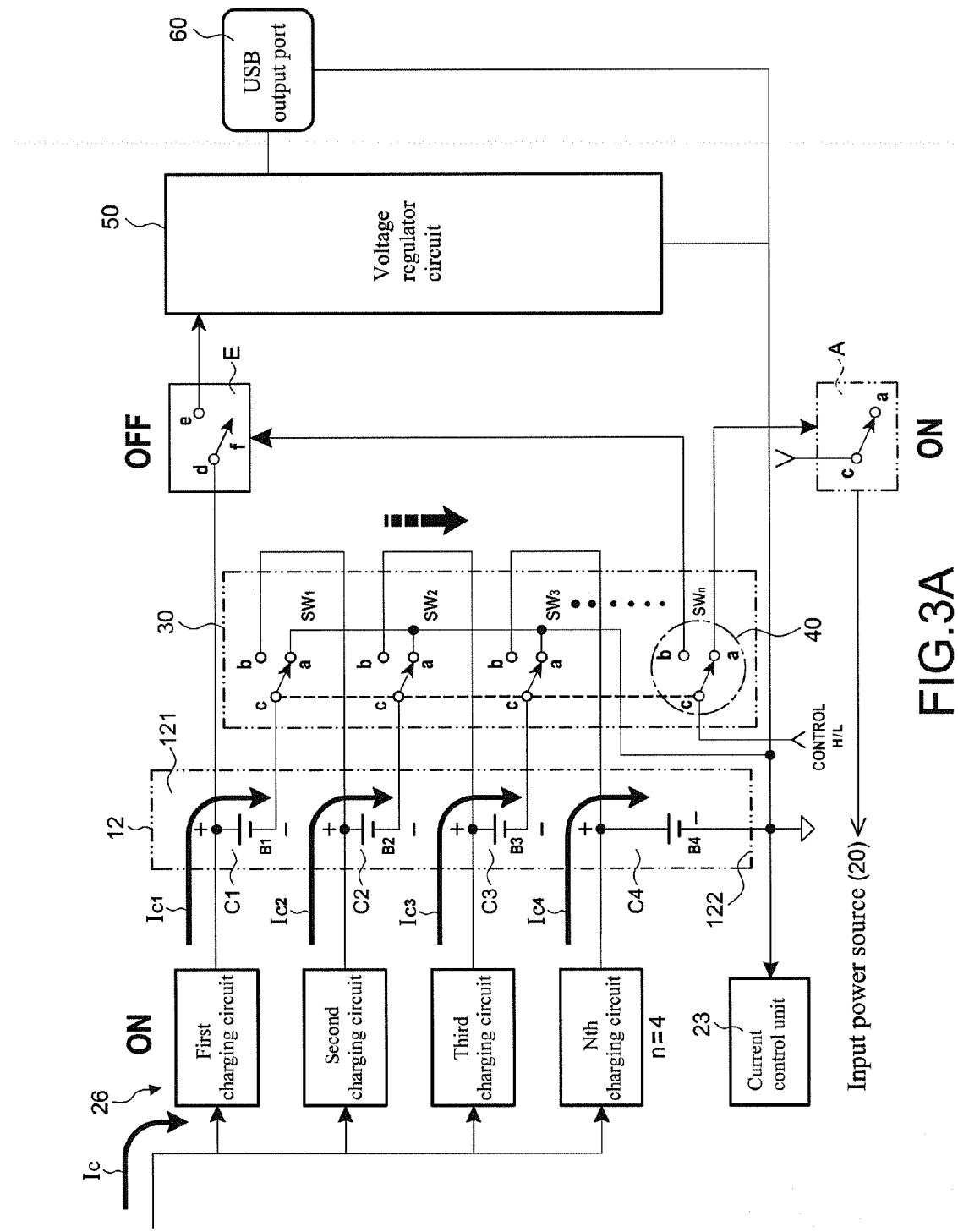
FIG. 3A is a schematic circuit diagram showing four independent charging circuits in accordance with the present invention.

The output terminal of the charging control unit 22 in accordance with the present invention further comprises a plurality of independent charging current control circuits 25 which can be circuit switches or components including but not limited to PWM driving circuits, and each of the output terminals is coupled to an anti-adverse-current element 251 which can be a diode D1~D4 or MOSFET, such that the charging block 12 has four independent charging circuits 26. With reference to FIG. 3A for the charging circuit 26, the first charging circuit to the fourth charging circuit 26 are formed respectively corresponding to the first charging compartment C1 to the fourth charging compartment C4. This circuit structure aims at providing an independent separate charging mode for the four pieces of batteries B1~B4 placed in the four charging compartments C1~C4 of the charging block 12. In other words, even if only one secondary battery is placed into the charging block 12, it still can be charged.

A current detection component 27 is coupled to a negative terminal of the charging block 12, and the current detection component 27 can be a resistor R and is connected to the current and voltage control units 23, 24 for detecting current by the charging of the charging block 12 and using it as a voltage feedback current control to make adjustments. In another charging control method, the charging current control circuit 25 is provided for setting a current, such that a constant charging current can be achieved.

Figure 6B:
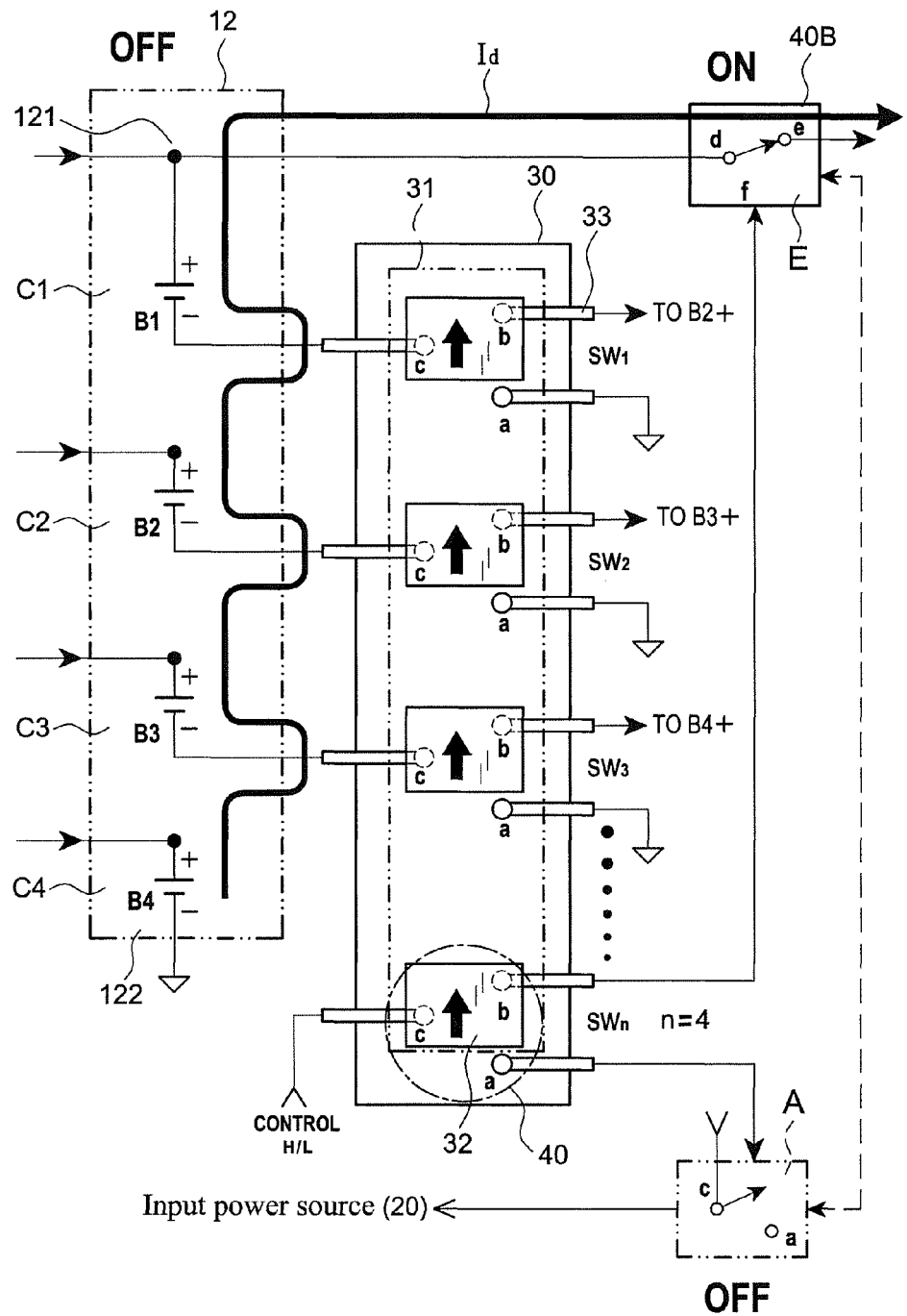

A manual switch 30 includes a switching insulated operating interface 31 disposed on a main body of the manual switch 30 and exposed from a surface of the casing 11 as shown in FIG. 1. In FIG. 3A, the manual switch 30 includes n−1 sets of mechanical switching units $SW_1$~$SW_{n-1}$ therein corresponding to a plurality of charging circuits n of the charging block 12, such that one set of mechanical switching unit is disposed between two adjacent charging circuits, and the last set of mechanical switching unit $SW_n$ of the manual switch 30 is an independent charging/discharging control module 40, and each of the mechanical switching units $SW_1$~$SW_n$ has three contact points a, b, c, wherein each contact point a of the first to the $(n-1)^{th}$ sets of mechanical switching units $SW_1$~$SW_{n-1}$ is grounded or grounded through a current detection resistor R, and the contact point b is coupled to a positive terminal of a next charging circuit. For example, $SW_1$ is coupled to the positive terminal of B2, and $SW_3$ is coupled to the positive terminal of B4, and the contact point c is electrically coupled to the negative terminal of each corresponding charging compartment C1~C3, and the negative terminal 122 of the last set of charging compartment C4 is grounded, and the contact point a of the $n^{th}$ set of mechanical switching unit $SW_n$ serving as the charging/discharging control module 40 is a charging control terminal, and the contact point b is a discharging control terminal, and the contact point c is a power control terminal CONTROL H/L coupled to the input power source 20 or grounded to form a control circuit. In FIGS. 6A and 6B, n pieces of independent conductive terminals 32 installed at the bottom of the manual switch 30 is linked to shift synchronously when the insulated operating interface 31 of the manual switch 30 is switched. When each of the conductive terminals 32 is switched to any position, an end of the conductive terminal 32 is always electrically coupled to its corresponding contact point c and the other end of the conductive terminal 32 is electrically coupled to the contact point a or contact point b only. In this preferred embodiment, n is equal to 4, indicating that there are four charging circuits and four mechanical switching units, but the present invention is not limited to this number only.

A charging control circuit A is comprised of a charging contact point a and a charging contact point c of the charging/discharging control module 40 and electrically coupled to the input power source 20 for controlling the ON/OFF of the input power source 20 or outputting a charging power to the charging block 12.

A discharging control switch E comprises an input terminal d, an output terminal e and a control terminal f, wherein the input terminal d is coupled to a positive terminal 121 of the first charging compartment C1 in the charging block 12, and the output terminal e is coupled to a voltage regulator circuit 50, and the control terminal f is electrically coupled to the contact point b of the charging/discharging control module 40 for controlling the ON/OFF of the input terminal d and the output terminal e, such that the discharging current $I_d$ of each serially connected and combined battery B1~Bn in the charging block 12 is outputted to the voltage regulator circuit 50. The discharging control switch E is a mechanical switch or an electronic switch linked to the contact point b of the charging/discharging control module 40, and the discharging control switch E is coupled to the voltage regulator circuit 50 externally or built in the voltage regulator circuit 50.

The voltage regulator circuit 50 is used for boosting or stepping down an input power to a predetermined DC voltage.

At least one USB output port 60 is coupled to an output terminal of the voltage regulator circuit 50, and a socket of the USB output port 60 is exposed from the casing 11.

Whereby when the manual switch 30 is switched to a charging mode, all n sets of mechanical switching units $SW_1$~$SW_n$ synchronously turn each of the contact points c and each of the contact points a ON, such that the battery B1~Bn on each charging circuit 26 is in an independent separate charging mode, and synchronously control the discharging control switch E to OFF and the charging control circuit A to ON, such that each battery is charged by the charging current $I_c$. When the manual switch 30 is switched to a discharging mode, all n sets of mechanical switching units $SW_1$~$SW_n$ synchronously turn each of the contact points c and each of the discharging contact points b ON, such that the battery B1~Bn on each charging circuit is in a serially connected and combined discharging mode, and synchronously turn the charging control circuit A OFF and turn the discharging control switch E ON, such that each serially connected battery outputs a discharging current $I_d$, so as to form an independent separate charging or a serially connected and combined discharging between charging and discharging circuits by a single manual switch 30 and synchronously control the ON/OFF of the charging current $I_c$ and the discharging current $I_d$.

In this preferred embodiment, the mechanical switching unit $SW_n$, n=4 at the bottom is used as the charging/discharging control module 40. In this mechanical switching unit $SW_n$, the contact point b is coupled to the discharging control switch E, and each contact point b of the remaining mechanical switching units $SW_1$~$SW_3$, is electrically coupled to a positive terminal of the next charging compartment C2~C4 respectively, such that when the manual switch 30 as shown in FIGS. 3A and 6A is switched down by the insulated operating interface 31, the conductive terminal 32 at the contact point c is driven to shift downward synchronously. Now, the negative terminals of the first to fourth charging compartments C1~C4 of the charging circuit are grounded, so that each charging compartment C1~C4 becomes an independent charging circuit. If a rechargeable battery is placed in any one of the charging compartments C1~C4, the rechargeable battery is charged by any of the independent charging current $I_{c1}$~$I_{c4}$. Unlike the charging mode of the conventional charger that must charge a group of four batteries or a group of two batteries at a time, the charger 10 of the present invention can charge even one battery only at a time, not only providing a convenient use, but also avoiding the overheating and undercharge.

Regardless of the number of batteries B1~B4 placed in the charging compartment C1~C4, the batteries B1~B4 can be charged, and the fully charged one can be removed from the charger 10 first for its use.

Figure 3B:
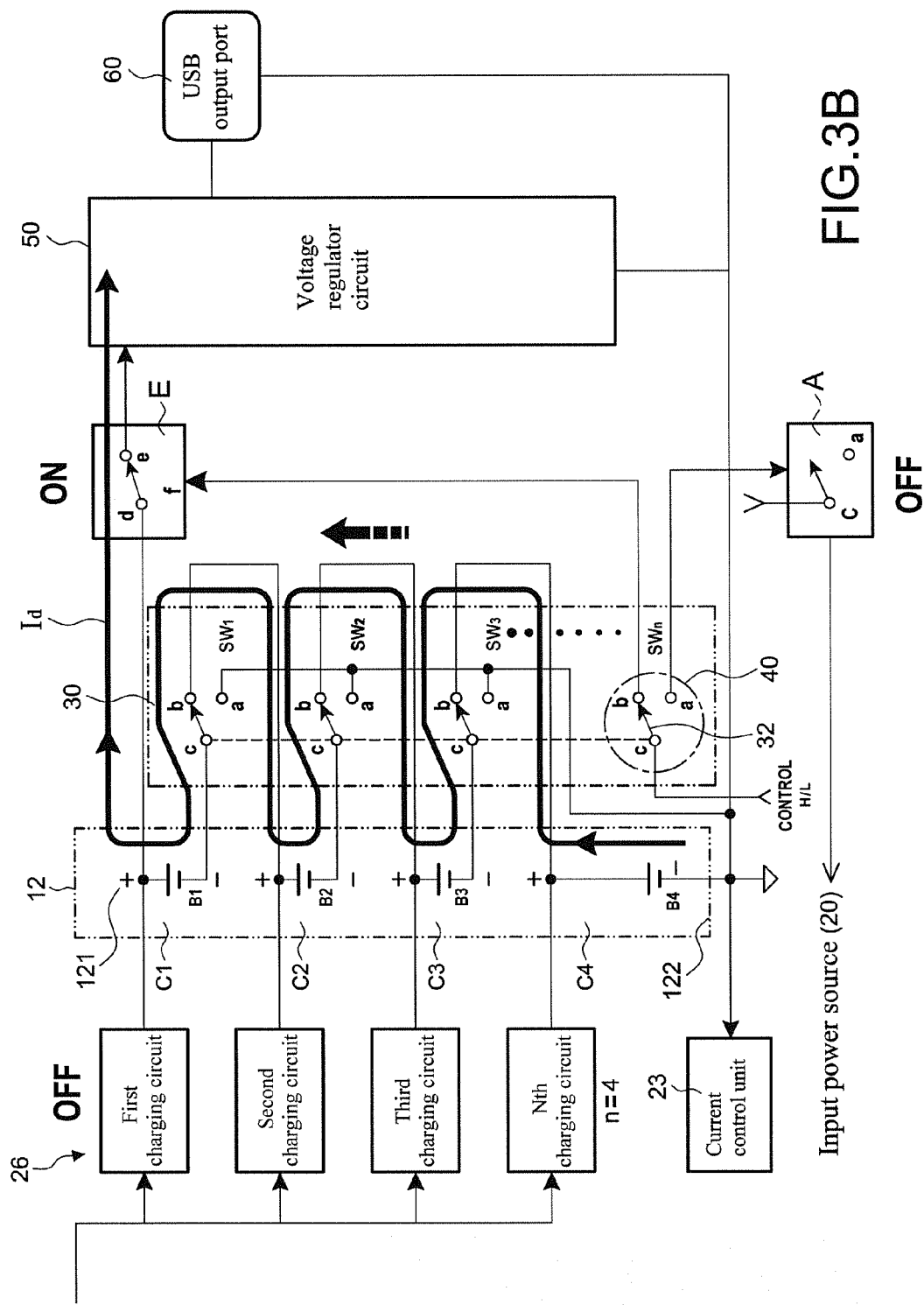
FIG. 3B is a schematic circuit diagram showing a serially connected discharging circuits in accordance with the present invention.
Figure 4A:
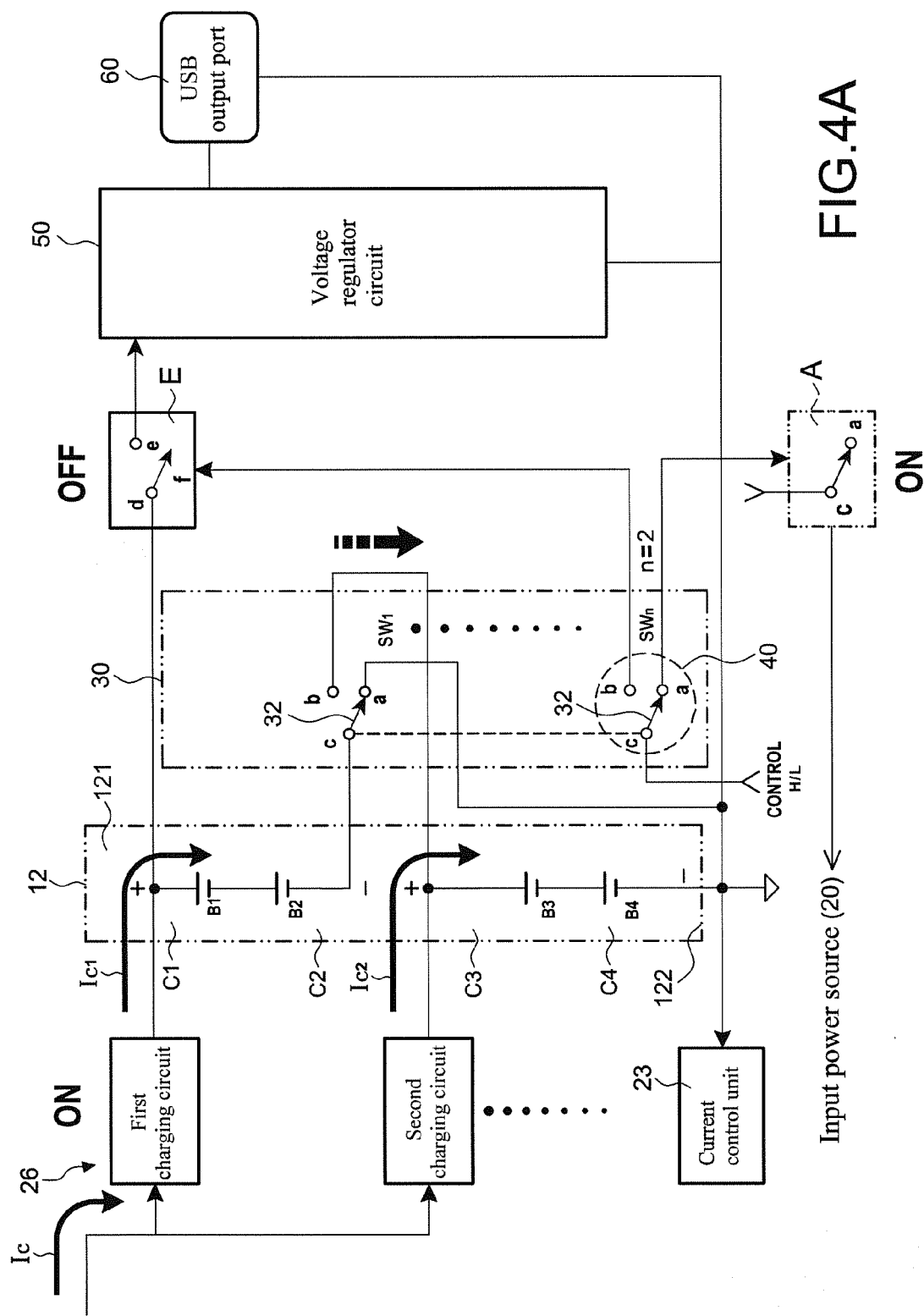
FIG. 4A is a schematic circuit diagram showing two independent charging circuits in accordance with the present invention.
Figure 4B:
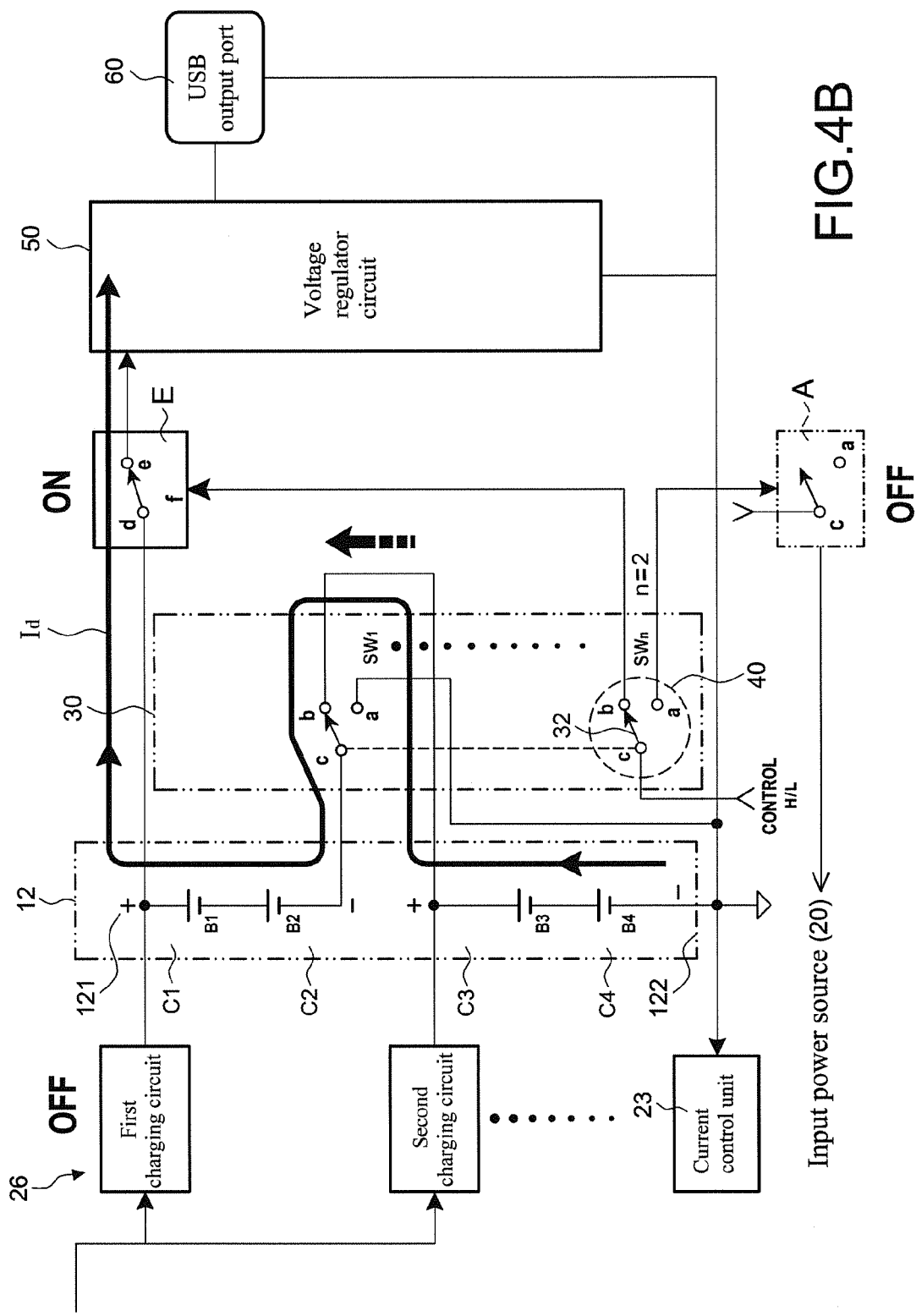
FIG. 4B is a schematic circuit diagram showing a serially connected discharging circuits in accordance with the present invention.

If it is necessary to discharge and output electric power of a fully-charged battery B1~B4 in the first to fourth charging compartments C1~C4, the manual switch 30 is switched upward as shown in FIGS. 3B and 6B, and the exposed insulated operating interface 31 in FIG. 1 is pushed to another side. Now, the conductive terminal 32 at the contact point c is shifted upward synchronously, and turning each contact point b of the mechanical switching units $SW_1 \sim SW_4$ ON. Now, each battery B1~B4 in the charging block 12 becomes a serially connected and combined discharging circuit, and the discharging control switch E is ON to output the discharging current $I_d$.

The input terminal of the voltage regulator circuit 50 is coupled to the output terminal 42 of the discharging control switch E for regulating the voltage of the discharging current $I_d$. In this preferred embodiment, the voltage regulator circuit 50 is a synchronous buck/boost DC/DC converter, and the buck/boost IC technology of this sort has been used extensively, and can provide a stable and accurate voltage output, and its internal circuit is a prior art and thus will not be described in detail here.

Since four pieces of nickel metal hydride/cadmium secondary batteries B1~B4 connected in series can only provide a voltage of 1.2V×4=4.8V which is still below the standard USB power output of DC 5.0V, therefore it is necessary to step up the voltage. Since the voltage of one alkaline primary battery is 1.5V, and four pieces provide a total voltage of 6V, the discharging current is different from that of the secondary battery and requires stepping down the voltage from 6V to 5V. On the other hand, the present invention adopts the foregoing voltage regulator circuit 50 that can regulate the discharge of different batteries by stepping the voltage up or down so as to assure that the electric power supply from the USB output port 60 has a stable and accurate voltage.

Figure 5A:
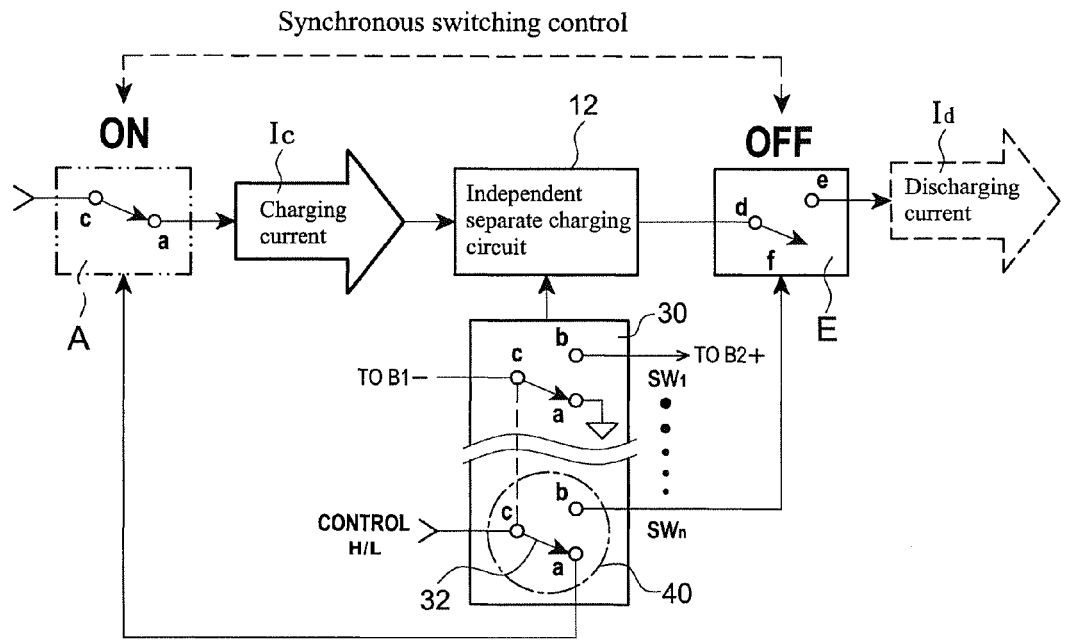
FIG. 5A is a schematic circuit diagram of a charging control of the present invention.
Figure 5B:
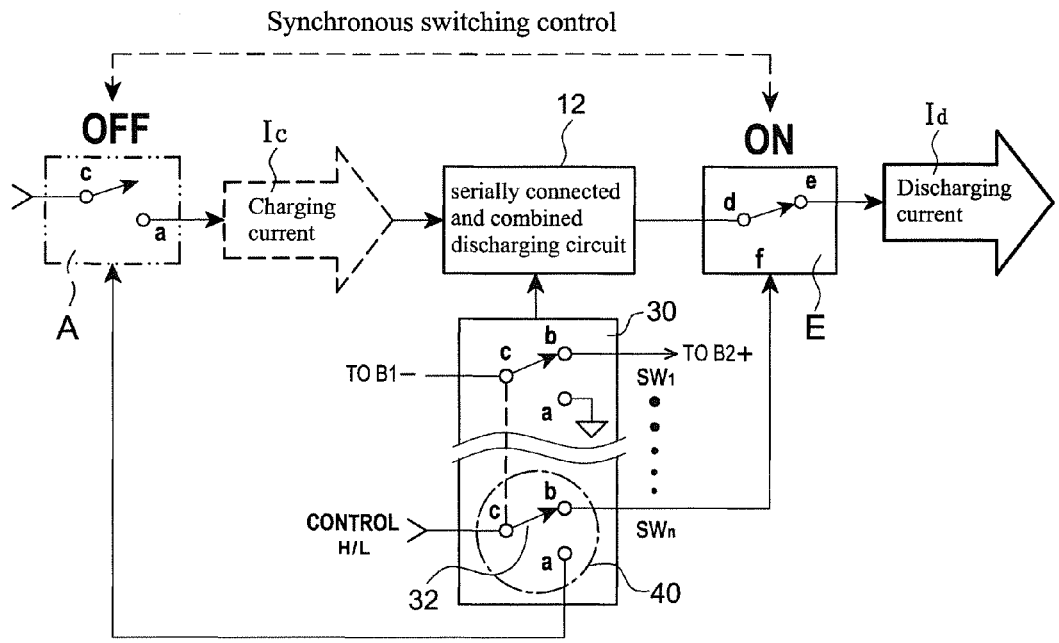
FIG. 5B is a schematic circuit diagram of a discharging control of the present invention.

With the foregoing technical measures and controls as shown in FIGS. 5A and 5B, the $n^{th}$ set of mechanical switching unit $SW_n$ of the manual switch 30 is used as the charging/discharging control module 40, and its contact point a is provided for turning on the charging control circuit A, and the contact point b is provided for turning on the discharging control switch E, which form a control with two opposite functions. In other words, when the manual switch 30 is switched to the charging mode, the contact point c and the contact point a of each mechanical switching unit $SW_1 \sim SW_n$ are ON, such that each battery in the charging block 12 is an independent separate charging circuit, and the charging control circuit A is ON to allow the charging current $I_c$ to enter the charging block 12; meanwhile the discharging control switch E is turned OFF automatically to situate at a charging status as shown in FIG. 5A. On the other hand, when the manual switch 30 is switched to the discharging mode as shown in FIG. 5B, the contact point c and the contact point b of each mechanical switching unit $SW_1 \sim SW_n$ are ON, and each battery in the charging block 12 is a serially connected and combined discharging circuit, and the charging control circuit A is turned OFF, and the discharging control switch E is turned ON to output the discharging current $I_d$. In the present invention, a charging/discharging circuit and a switch is provided for a synchronous switching control, such that when the charging block 12 charges the battery, the output of discharging current $I_d$ is turned off automatically, so as to prevent the interference to the output circuit from affecting the charging process. During the discharging process, the charging circuit is disconnected automatically to avoid interference to the discharging process. In a preferred embodiment, the charging control circuit A and the discharging control switch E are coupled to the contact point a and the contact point b of the charging/discharging control module 40 respectively for the control, wherein the contact points a, c of the charging/discharging control module 40 are the contact points a, c of the charging control circuit A in this preferred embodiment, and the contact point b is electrically coupled to the discharging control switch E. With the electric connection, if the contact points a, c are ON, the charging control circuit A will be ON. If the contact points b, c are ON, a signal will be transmitted to make the discharging control switch E ON. As to the charging control circuit A and the discharging control switch 40B, they are not limited to those illustrated in the figures only, but any method capable of switching the contact points a, b of the charging/discharging control module 400N/OFF synchronously can be adopted. Since the contact points a, b will not be turned ON at the same time, they are in opposite switching control state. Therefore, one of the contact points is ON, while the other one is OFF. The present invention applies this technical measure to achieve the switching purpose conveniently, so that the present invention can integrate several functions into one charger without increasing the overall volume or the complicity of the structure.

In addition to the features of "independent separate charging and serially connected and combined discharging" and "a one-time control for switching to a charging mode and a discharging mode synchronously" of the present invention, the present invention further adopts a manual switch 30 to overcome the shortcomings of the conventional electronic switch such as the internal impedance causing power loss, step-down voltage causing power drop, and delay affecting the charging efficiency of the charger.

The present invention skillfully uses the manual switch 30 to achieve the aforementioned features of "independent separate charging and serially connected and combined discharging" and "a one-time control for switching to a charging mode and a discharging mode synchronously". The slide switch is a prior art, and thus its switching principle will not be described in details here. The present invention further includes a two-stage slide switch with a plurality of pins as shown in FIGS. 6A and 6B. In this preferred embodiment, the manual switch 30 includes 12 contact points therein and 12 pins 33 extended from the manual switch 30. Every three points a, b, c as a group is set to constitute four sets mechanical switching units $SW_1 \sim SW_4$, wherein the four conductive terminals 32 are shifted together with the insulated operating interface 31 to synchronously turn all the contact points c and all contact points a ON or synchronously turn the contact points c and the contact points b ON. Since the switching is synchronous, there will be no delay, internal impedance or voltage drop, and the present invention can overcome the long-standing problems and shortcomings of the conventional electronic switch to enhance the charging and discharging performance.

In FIGS. 6A and 6B, the manual switch 30 has four sets of mechanical switching units $SW_1 \sim SW_n$, n=4. However, the number of sets can be changed to fit the charging circuit 26. For example, n charging circuits 26 will have n sets of mechanical switching units, and the $n^{th}$ mechanical switching unit $SW_n$ is the charging/discharging control module 40. Based on this principle, the present invention may have more than four sets (such as eight sets) of charging circuits. Of course, the present invention may have two sets of charging circuits as shown in FIGS. 4A, 4B, 6C and 6D. In this way, the manual switch 30 has two mechanical switching unit $SW_1 \sim SW_n$, n=2, and the $n^{th}$ (that is the second) set of mechanical switching unit $SW_2$ is the charging/discharging control module 40 whose principle and the connection of each contact point are the same as those as described in the foregoing four sets of mechanical switching unit $SW_1$~$SW_4$, and thus they will not be described here again.

Figure 6C:
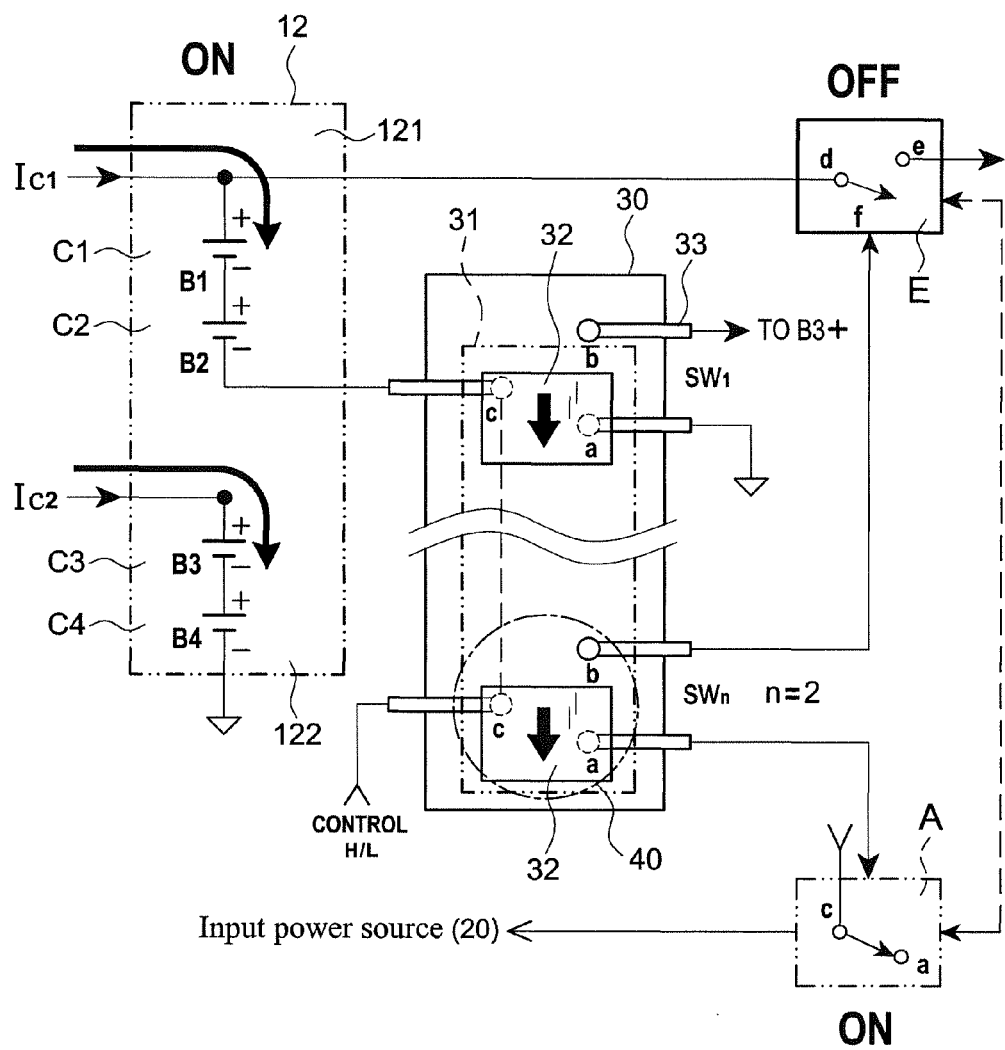
FIGS. 6C and 6D are schematic circuit diagrams showing a charging status and a discharging status of a manual switch in accordance with another embodiment the present invention respectively.
Figure 6D:
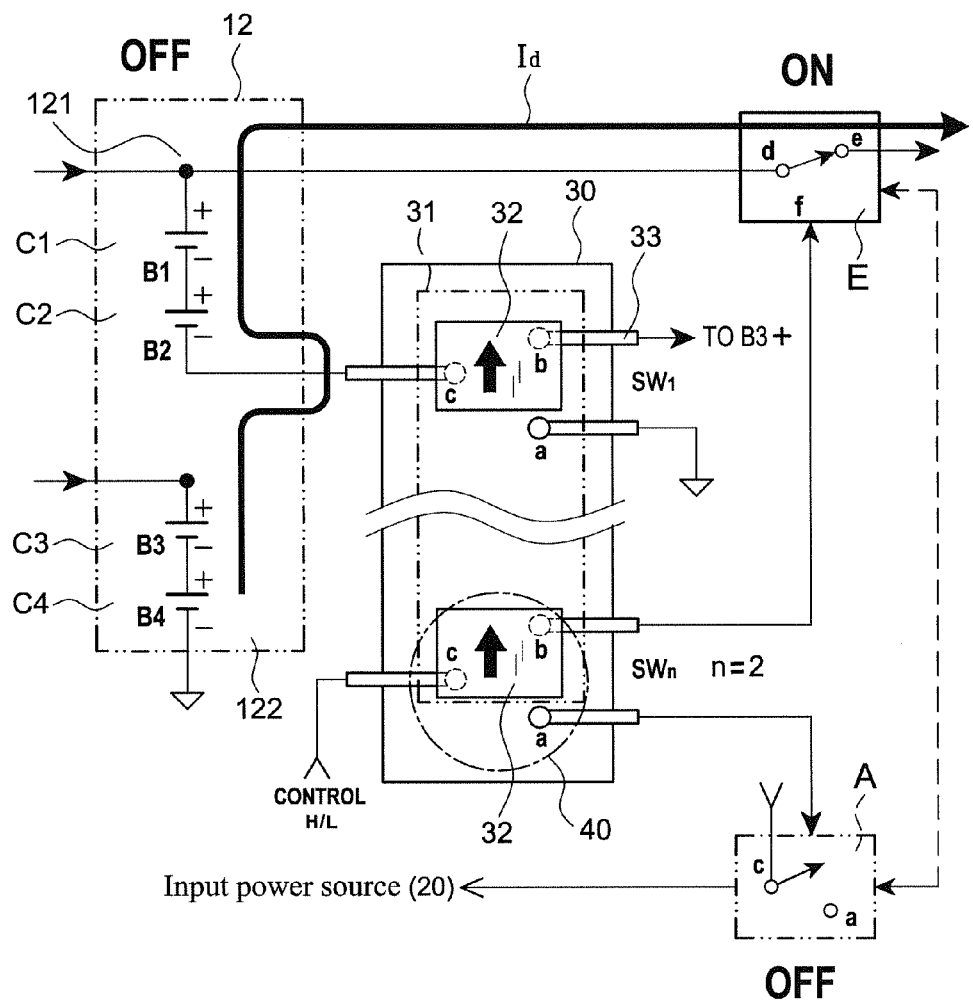

Further, the rechargeable battery B1~B4 can be placed in each corresponding charging compartment C1~C4. If there are four independent charging circuits in the charging block 12 as shown in FIGS. 6A and 6B, there will be four independent charging currents $I_{c1}$~$I_{c4}$. However, the present invention may electrically connect two charging compartments C1, C2 and C3, C4 as shown in FIGS. 6C and 6D, such that the charging circuit provides two independent charging currents $I_{c1}$~$I_{c2}$, which is also applicable to the present invention.

Therefore, a preferred embodiment of the present invention may have n sets of charging circuits in the charging block, wherein n is equal to 2, 4 or 8, and n−1 sets of mechanical switching units $SW_1$~$SW_{n-1}$ corresponding to the manual switch 30 include 1 set, 3 sets or 7 sets, and the last $n^{th}$ set of independent mechanical switching unit $SW_n$ may be added to the 1 set, 3 sets or 7 sets to serve as the charging/discharging control module 40.

In the present invention shown as FIG. 2, the switching power supply 20 is connected to an auxiliary power supply 70 and then to a voltage regulator circuit 50 for regulating the voltage and a standard USB power is provided from a USB output port 60.

Figure 7:
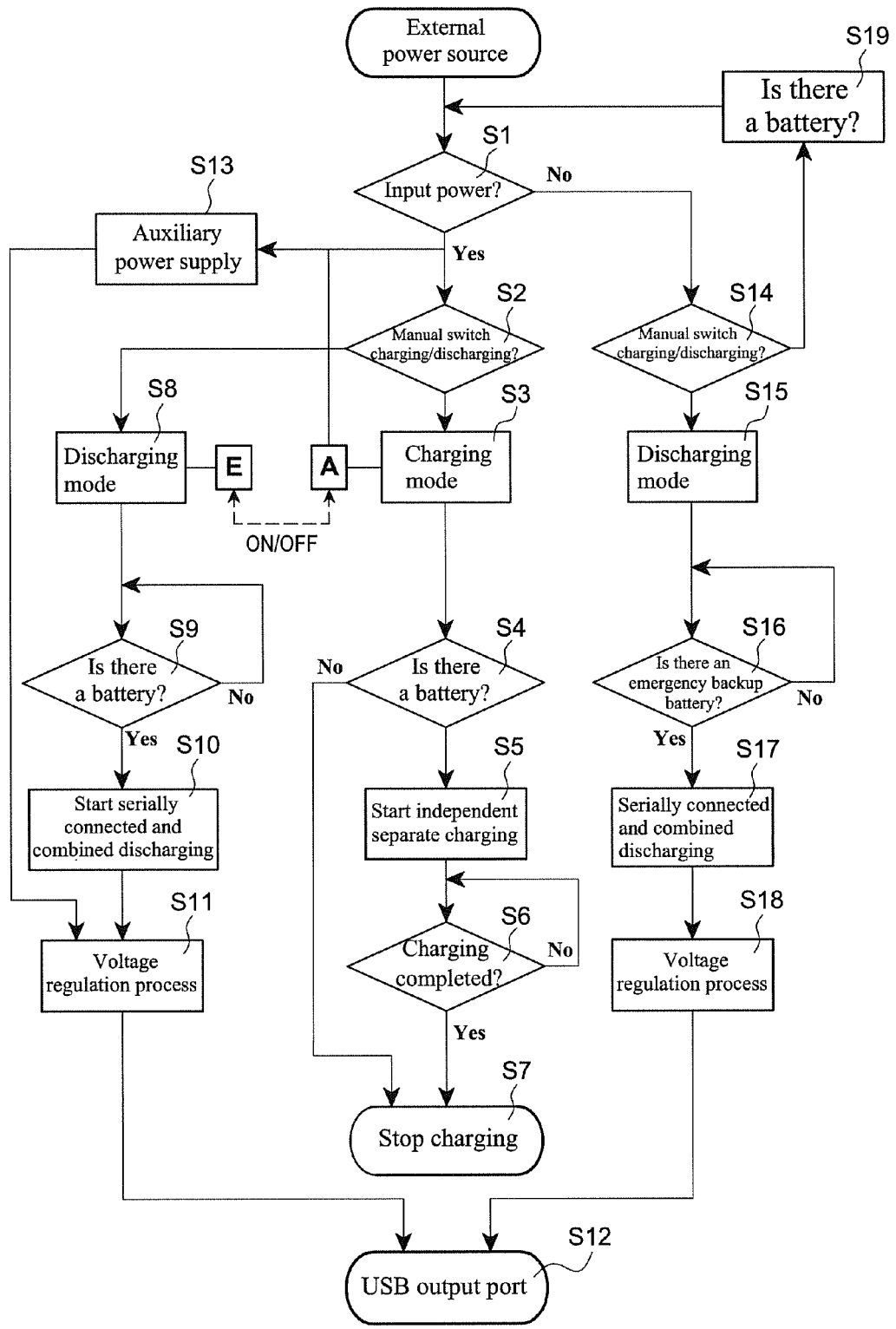
FIG. 7 is a flow chart of an operating procedure of the present invention.

With FIG. 7 for a flow chart of an operating procedure controlled by the charging control unit 22 in accordance with a preferred embodiment of the present invention, Step S1 determines whether or not there is an input power source 20, and if there is an input power source 20, then Step S2 determines whether or not the manual switch 30 is switched to a charging mode or a discharging mode. If Step 2 determines that the manual switch is in a charging mode, then Step S3 sets the battery in the charging block 12 to an independent separate charging circuit mode. Now, the charging/discharging control module 40 synchronously turn the discharging control switch E OFF and the charging control circuit A ON to set a charging mode, and then Step S4 determines whether or not there is a rechargeable battery in the charging block 12.

Step 5 turns on an independent separate charging circuit if Step 4 determines that there is a rechargeable battery, and step S6 determines whether or not the charging is completed, and will continue charging when not completed, or else enter into Step S7 to stop charging the battery if it is completed. Of course, a slight charging still can be performed after the charging process ends, and the details will not be described here.

In the foregoing Step S2, if it is determined that the manual switch 30 is switched to the discharging mode, Step 8 will take place. Now, the circuit in the charging block 12 is a serially connected and combined discharging circuit, and the charging/discharging control module 40 synchronously turns the charging control circuit A OFF, the input power source 20 OFF, and the discharging control switch E ON to set it at a discharging mode. Then, Step S9 determines whether or not there is a battery, and Step 10 takes place to start the serially connected and combined discharging circuit if there is a battery in the charging block 12, such that each battery is serially connected and discharged. For a secondary battery with a lower voltage (4.8V), Step S11 will regulate the voltage by stepping up the voltage automatically by a voltage regulator circuit 50. For a primary battery with a higher voltage (6V), Step S11 will step down the voltage. The step-up and stepdown of the voltage in Step S11 is performed by the voltage regulator circuit 50, and a stable electric power with a standard USB voltage of DC 5.0V is output to Step 12 for an external electronic product.

In the foregoing Step S1, if it is determined that there is no input power source 20, the procedure will enter S14 to determine whether or not the manual switch 30 is switched to a discharging mode or a charging mode, and if it is determined that the manual switch 30 is switched to the charging mode, then the procedure ends. If it is determined that the manual switch 30 is switched to the discharging mode, then Step S15 takes place. Now, the circuit in the charging block 12 is a serially connected discharging circuit, and an emergency backup battery can be placed into the charging block 12. Step S16 determines whether or not there is a battery in the charging block 12, and step S17 takes place if there is a battery in the charging block 12, and then the Steps S17~S18 are the same as the Steps S10~S11, and finally in Step S12, an electric power of standard voltage is output from the USB output port 60.

In the foregoing Step S1, if it is determined that there is an input power source 20, another procedure takes place at the same time of S2, wherein the input power source 20 is inputted directly to the auxiliary power supply 70 of Step S13, and the auxiliary power supply 70 stabilize the voltage in Step S11 and enters Step S12 to output an electric power of a standard voltage from the USB output port 60. When the auxiliary power supply 70 supplies electric power, the discharging mode of Step S8 is disabled.

Figure 8:
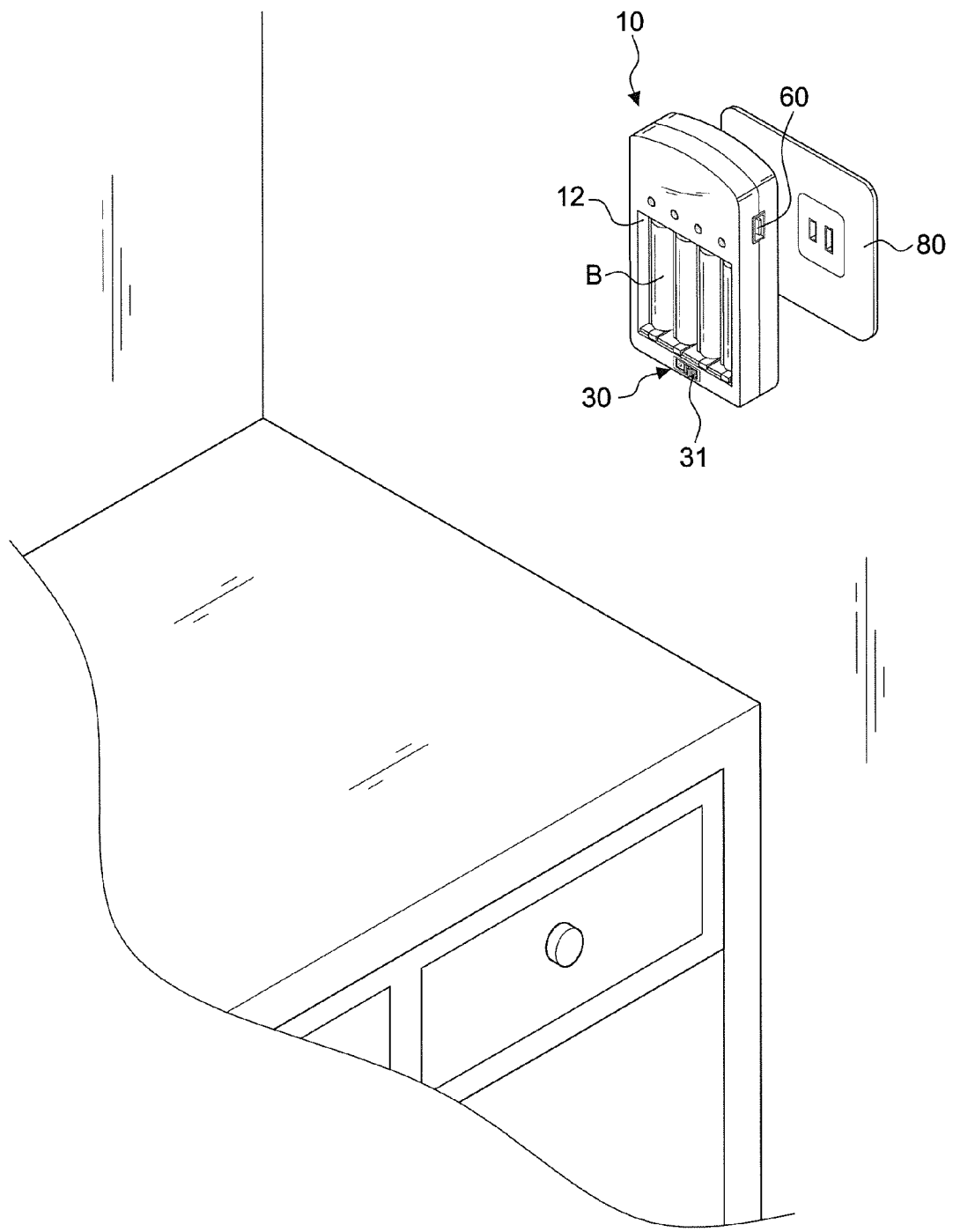
FIG. 8 is a schematic view of an application of the present invention, showing a charger connected to an external power source.
Figure 9:
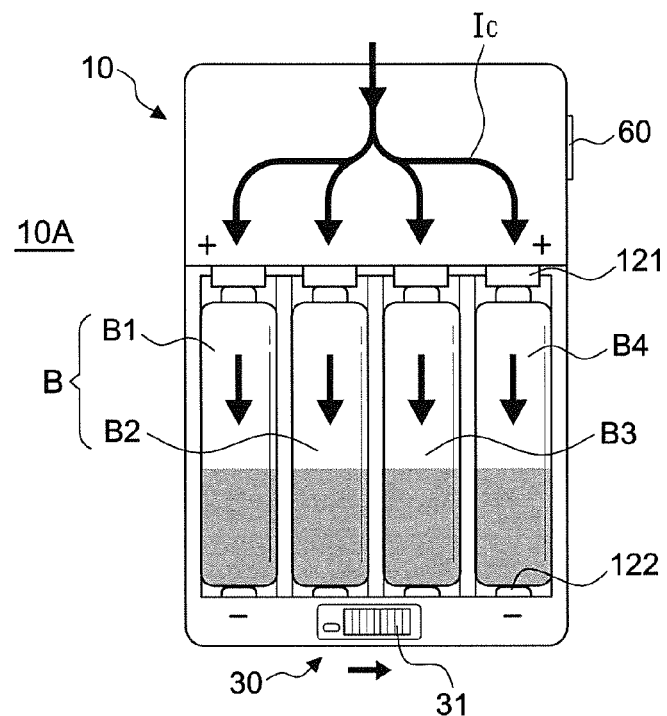
FIG. 9 is a schematic view of an application as a charger in accordance with the present invention.
Figure 10:
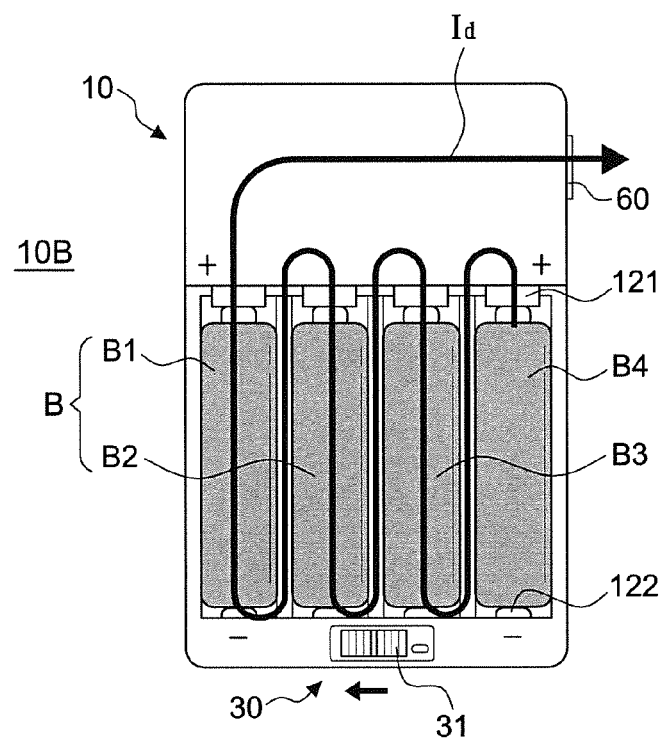
FIG. 10 is a schematic view of an application as a discharger in accordance with the present invention.
Figure 11:
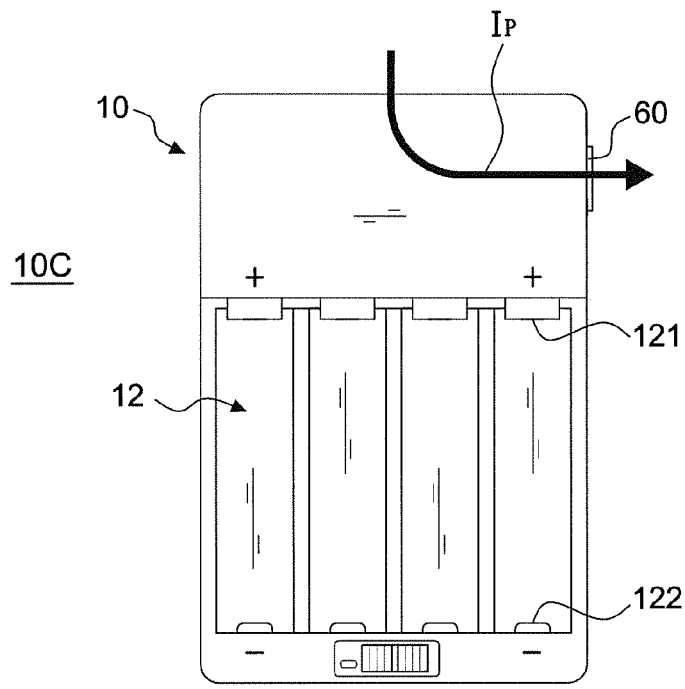
FIG. 11 is a schematic view of an application as an adaptor in accordance with the present invention.
Figure 12:
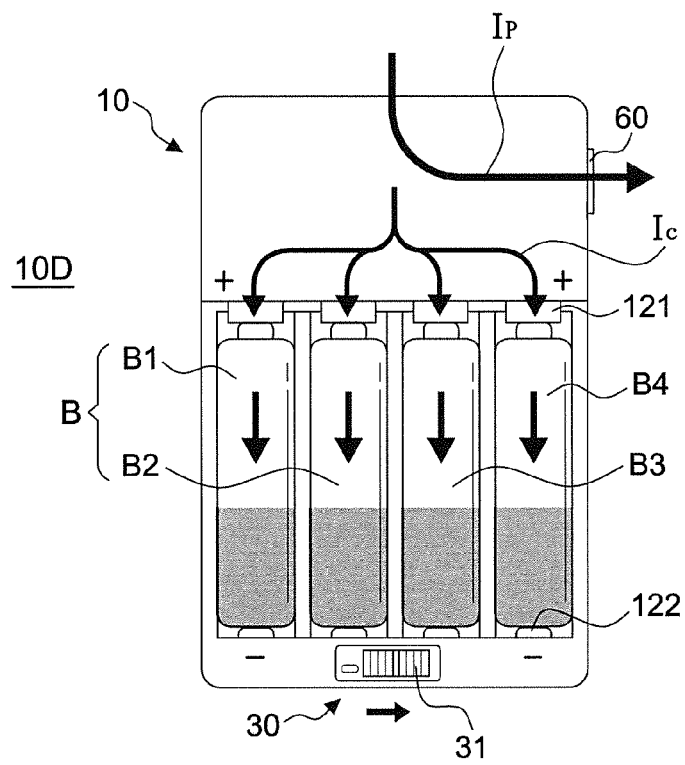
FIG. 12 is a schematic view of an application as an adaptor and a charger concurrently in accordance with the present invention.

According to the aforementioned control procedure, the charger 10 of the present invention can be used with the following modes:

(a) Under the condition of having an external power source:

i) When the insulated operating interface 31 of the manual switch 30 is switched to a charging mode, each charging circuit 26 for a plurality of rechargeable batteries B in the charging block 12 is an independent separate charging circuit, and the charging/discharging control module 40 synchronously turns the charging control circuit A ON and the discharging control switch E OFF, so as to form a battery charger 10A. In the applications as shown in FIGS. 8 and 9, when the present invention is used as a charger, even one or two batteries can be charged.

ii) When the insulated operating interface 31 of the manual switch 30 is switched to a discharging mode, each battery B1~B4 in the charging block 12 is a serially connected and combined discharging circuit, and the charging/discharging control module 40 synchronously controls the charging control circuit A to turn OFF and the discharging control switch E to turn ON, such that the serially connected discharging current $I_d$ is regulated by the voltage regulator circuit 50 to supply the required electric power from the USB output port 60, so as to form a discharger 10B, and this application is shown in FIG. 10.

iii) If the battery in the charging block 12 is low or there is no battery in the charging block 12 as shown in FIG. 11, the auxiliary power supply 70 can directly supplies a current $I_p$ through the voltage regulator circuit 50, and then to the USB output port 60, such that the charger 10 becomes an adaptor 10C under the condition of having an output power source 20. In FIG. 12, when the charger 10 charges each battery B in the charging block 12, an electric power is supplied to the USB output port 60 at the same time, such that the charger becomes an adaptor/charger 10D without affecting the power supply for the electronic product during the charging process.

Figure 13:
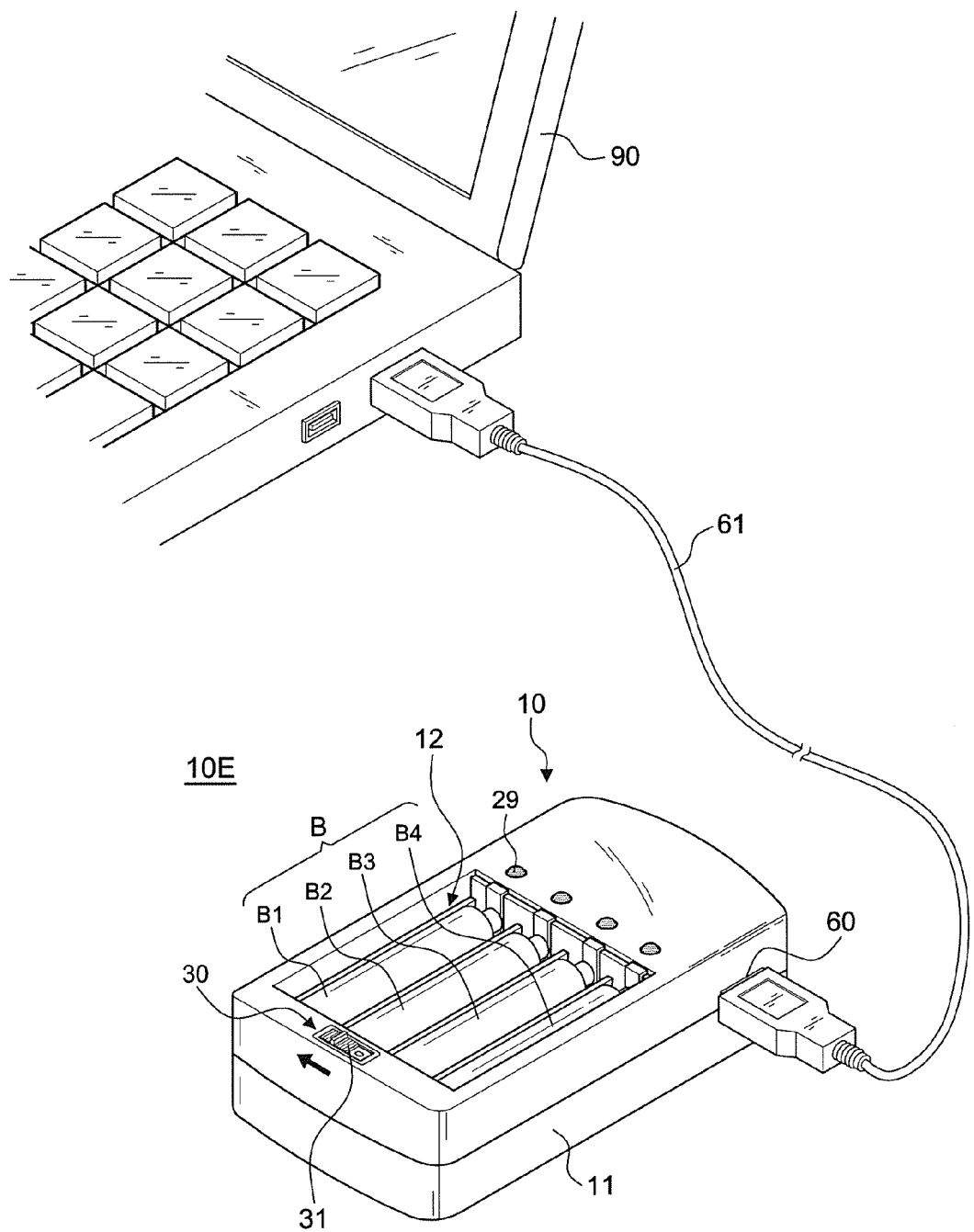
FIG. 13 is a schematic view of an application as a portable power in accordance with the present invention.

(b) Under the condition of having no external power source:

i) When the manual switch 30 is switched to the charging mode, there is no charging current for each charging circuit 26. Now, the charger 10 is not in use.

ii) When the manual switch 30 is switched to the discharging mode, a charged backup secondary battery or a primary battery B1~B4 in the charging block 12 forms a serially connected and combined discharging circuit, and the charging/discharging control module 40 synchronously controls the discharging control switch E to turn ON, such that the voltage of the serially connected discharging current $I_d$ can be regulated by the voltage regulator circuit 50, and the required electric power supplied from the USB output port 60 can be outputted to a portable electronic product 90 through a transmission cable 61, so as to form a portable power or an emergency power supply 10E, and this application is shown in FIG. 13.

In summary, the present invention uses a manual switch to integrate the features of an "independent separate charging circuit" and a "serially connected and combined discharging circuit" to synchronously control the switch and ON/OFF of the charging and discharging circuits of the charging compartment. The invention not only provides a convenient operation, but also overcomes the shortcomings of the conventional chargers and achieves the effects of enhancing the charging and discharging performance, and integrates several functions into one charger to improve its practicability.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An integrated battery charger, comprising:
a casing, for containing charging components, and having a charging block disposed on a surface of the casing, a plurality of charging compartments formed in the charging block for placing a plurality of AA or AAA batteries respectively, and an end of the charging compartment being a positive terminal, and the other end of the charging compartment being a negative terminal, and the casing having a plug connectible to an external power source;
an input power source, for converting an external (AC or DC) power into an DC power to charge any one of the batteries in the charging block and supply a reference voltage source to a charging control unit;
a voltage control unit and a current control unit, coupled between an input terminal of the charging control unit and the input power source to form a charging circuit, and an output terminal of the charging control unit comprising a plurality of charging current control circuits, such that the charging block forms a plurality of independent separate charging circuits, and an output terminal of each charging circuit is coupled to a positive terminal of each of the charging compartments;
a manual switch, with a main body having a switchable insulated operating interface, and the insulated operating interface being exposed from a surface of the casing, and containing (n−1) sets of mechanical switching units (SW1~SWn−1) corresponding to a plurality of charging circuits (n) of the charging block, such that one set of mechanical switching unit is disposed between two adjacent charging circuits, and the last set of mechanical switching unit (SWn) of the manual switch is an independent charging/discharging control module, and each of the mechanical switching units (SW1~SWn) has three contact points a, b, c, wherein the contact point a of the first to $(n-1)^{th}$ sets of mechanical switching units (SW1~SWn−1) is grounded or grounded through a current detection resistor, and the contact point b is coupled to a positive terminal of a next charging circuit, and the contact point c is electrically coupled to a negative terminal of each corresponding charging compartment, and the contact point a of the nth set of the mechanical switching unit ($SW_n$) as the charging/discharging control module is a charging control terminal, the contact point b is a discharging control terminal, and the contact point c is a power control terminal (CONTROL H/L) coupled to the input power source or grounded, and when the insulated operating interface of the manual switch is switched, n pieces of independent conductive terminals disposed at the bottom of the manual switch are linked to shift synchronously, and when each of the conductive terminals is switched to any position, an end of the conductive terminal is always electrically coupled to the corresponding contact point c, and the other end of the conductive terminal is electrically coupled to the contact point a or the contact point b only;
a charging control circuit, composed of a contact point a and a contact point c of the charging/discharging control module, and electrically coupled to the input power source, for controlling the ON/OFF of outputting a charging power from the input power source to the charging block;
a discharging control switch, comprising an input terminal, an output terminal and a control terminal, and the input terminal being coupled to a positive terminal of the first charging compartment in the charging block, and the output terminal being coupled to a voltage regulator circuit, and the control terminal being electrically coupled to a contact point b of the charging/discharging control module, for controlling the ON/OFF of the input terminal with the output terminal, such that the serially connected and combined discharging current of each battery in the charging block is outputted to the voltage regulator circuit;
the voltage regulator circuit, for boosting or stepping down the input power to a predetermined DC voltage; and
at least one USB output port, coupled to an output terminal of the voltage regulator circuit, and having a socket exposed from the casing;
whereby, when the manual switch switches to a charging mode, each contact point c and each contact point a of all n sets of mechanical switching units ($SW_1$~$SW_n$) are turned ON synchronously, such that each battery on the charging circuit is in an independent separate charging mode, and the discharging control switch E is turned OFF synchronously, and the charging control circuit (A) is controlled to turn ON to charge each battery by the charging current, and when the manual switch switches to a discharging mode, each contact point c and each contact point b of all n sets of mechanical switching units ($SW_1$~$SW_n$) are turned ON synchronously, such that each battery on the charging circuit is in a serial connected and combined discharging mode, and the charging control circuit (A) is turned OFF and the discharging control switch (E) is turned ON synchronously, such that each battery is serially connected to output the discharging current, so as to form a single manual switch capable of integrating the independent separate charging or the serially connected and combined discharging between the charging and discharging circuits, and synchronously controlling the ON/OFF of the charging current and discharging current.

2. The integrated battery charger as recited in claim 1, wherein the charging block has n sets of charging circuits, and n is equal to 2, 4 or 8, and the (n−1) sets of the mechanical switching units ($SW_1$~$SW_{n-1}$) corresponding to the manual switch is equal to 1 set, 3 sets or 7 sets, and the 1 set, 3 sets or 7 sets plus the last nth set of independent mechanical switching unit ($SW_n$) form the charging/discharging control module.

3. The integrated battery charger as recited in claim 2, wherein the manual switch is a slide switch, a press-button switch or a differential switch, and each set of the mechanical switching unit comprises at least three pins.

4. The integrated battery charger as recited in claim 1, wherein the operation modes of the charger include:
 a) under the condition of having an external power source:
  i) when the manual switch switches to the charging mode, the plurality of rechargeable batteries in the charging block forms independent and separate charging circuits, and the charging/discharging control module synchronously controls the charging control circuit (A) to turn ON and the discharging control switch (E) to turn OFF, so as to constitute a battery charger;
  ii) when the manual switch switches to the discharging mode, each battery of the charging block forms a serially connected and combined discharging circuit, and the charging/discharging control module synchronously controls the charging control circuit (A) to turn OFF and the discharging control switch (E) to turn ON, such that the serially connected discharging current is outputted through the voltage regulator circuit for stabilizing the voltage, and then the USB output port supplies an electric power, so as to form a discharger;
 b) under the condition of having no external power source:
  i) when the manual switch switches to the charging mode, each charging circuit has no charging current, and the charger is in a non-using status; and
  ii) when the manual switch switches to the discharging mode, a charged backup secondary battery or a primary battery in the charging block forms a serially connected and combined discharging circuit, and the charging/discharging control module synchronously controls the discharging control switch (E) to turn ON, such that the serially connected and combined discharging current is stabilized by the voltage regulator circuit, and then the USB output port supplies an electric power to a portable electronic product, so as to form a portable power or an emergency power supply.

5. The integrated battery charger as recited in claim 4, wherein the input power source is further externally coupled to an auxiliary power supply, and the auxiliary power supply is coupled to the voltage regulator circuit for stabilizing the input power source and then supplying the power to the USB output port, such that the charger can charge the batteries concurrently, independently and separately and can output a USB power at the same time, so as to form a dual function device with the functions of a charger and an adaptor, and capable of charging a battery and supplying an electric power to an electronic product concurrently.

6. The integrated battery charger as recited in claim 4, wherein the input power source is further externally coupled to an auxiliary power supply, and the auxiliary power supply is coupled to the voltage regulator circuit for stabilizing the input power source and then supplying the power to the USB output port, such that if no battery is placed into the charger for charging, a USB power can be outputted, so as to form an adaptor device for supplying an electric power to an electronic product directly.

7. The integrated battery charger as recited in claim 1, wherein the negative terminal of the charging block comprises a current detection component, and the current detection component comprises a resistor coupled to the current control unit, and the output terminal of the charging current control circuit further comprises an anti-adverse-current element, and a switch is installed between the input power source and the current and voltage control unit.

8. The integrated battery charger as recited in claim 7, wherein the anti-adverse-current element is comprised of a diode or a MOSFET.

9. The integrated battery charger as recited in claim 1, wherein the discharging control switch (E) comprises a mechanical switch or an electronic switch linked with a contact point b of the charging/discharging control module, and the discharging control switch (E) is coupled to the exterior of the voltage regulator circuit or built in the voltage regulator circuit.

10. The integrated battery charger as recited in claim 1, wherein the charging control unit further comprises a display unit coupled to the charging control unit and installed on a surface of the casing.

* * * * *